UNITED STATES PATENT OFFICE.

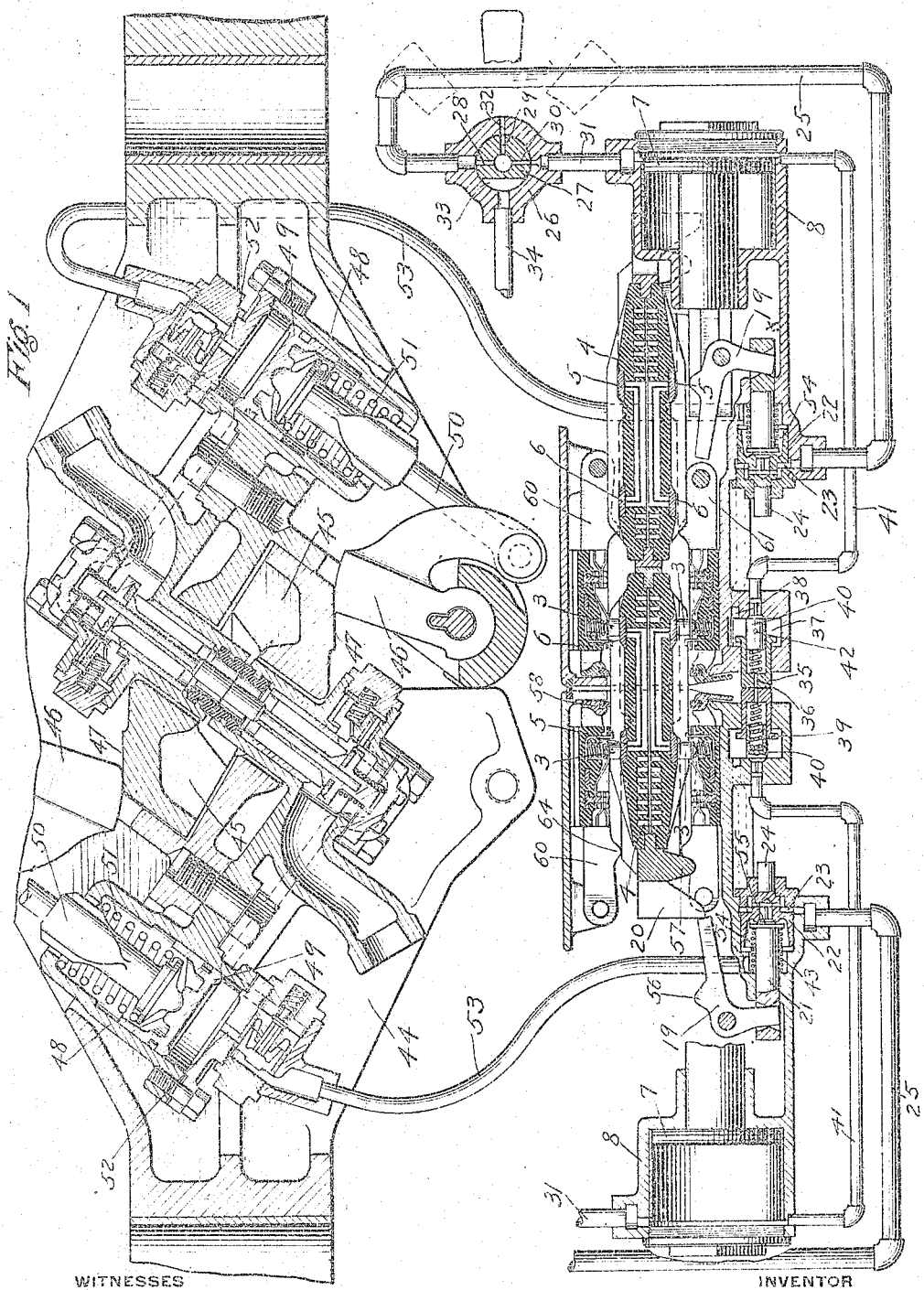

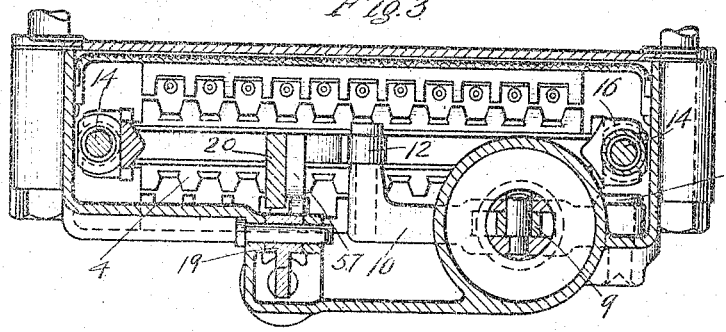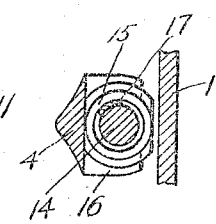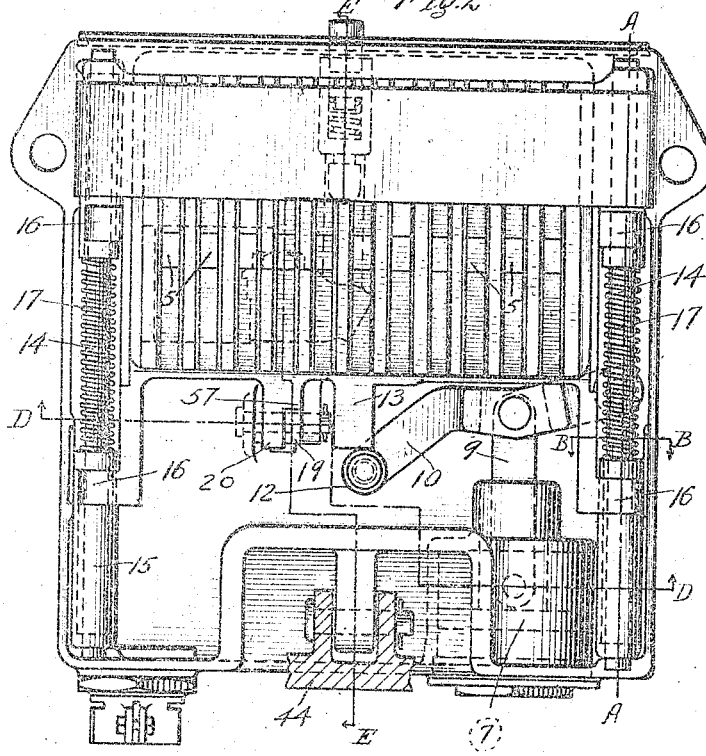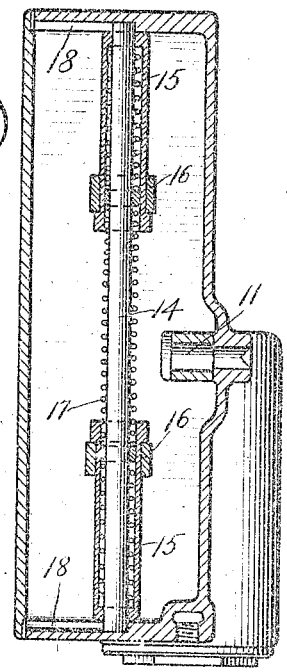

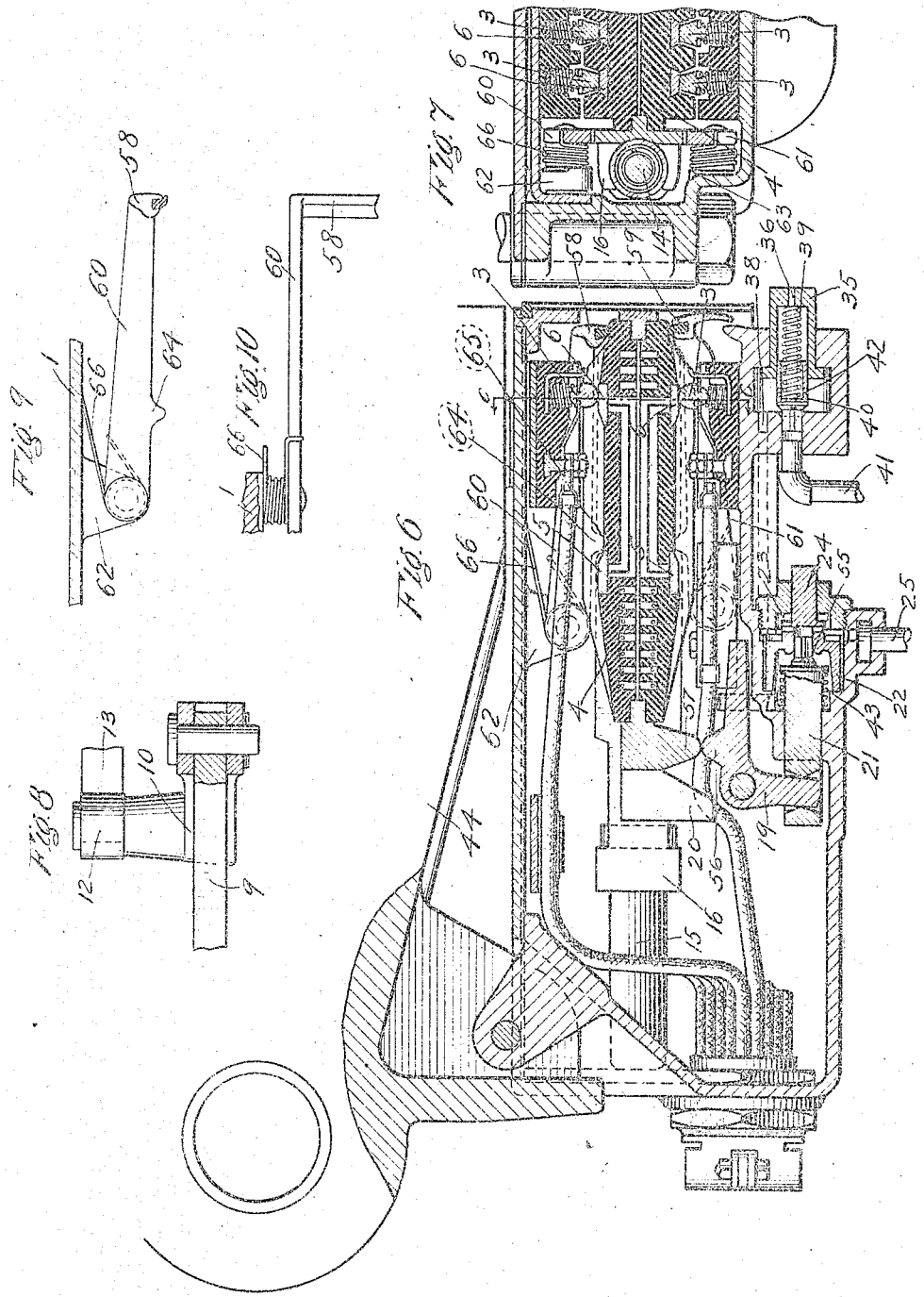

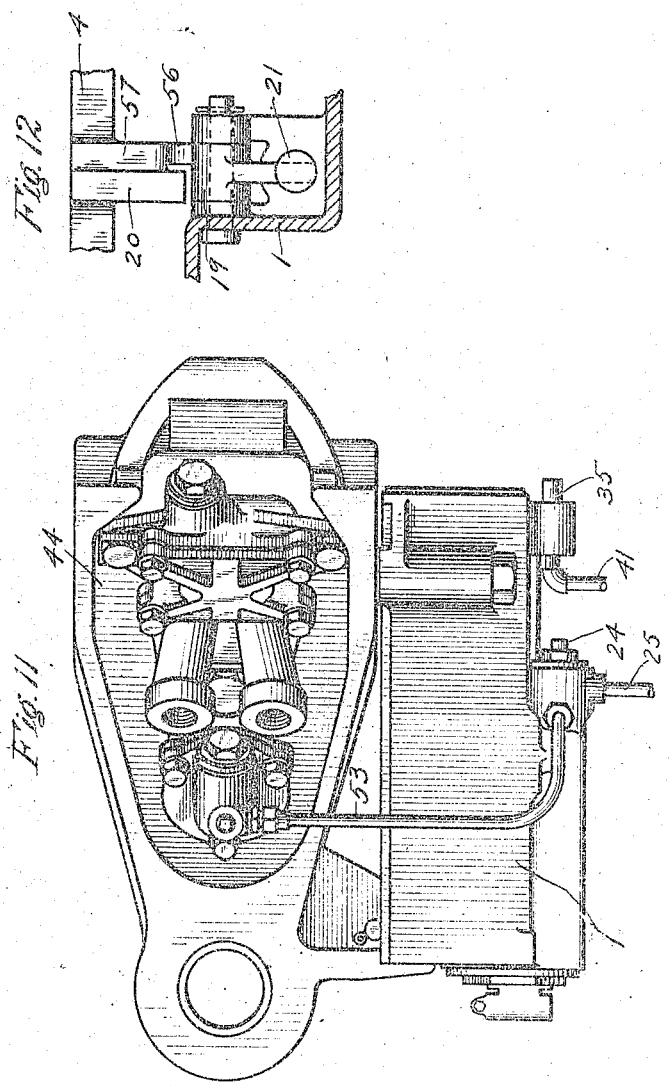

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

CAR AND ELECTRIC COUPLING.

1,194,353.

Specification of Letters Patent.

Patented Aug. 15, 1916.

Application filed March 11, 1914. Serial No. 823,970.

*To all whom it may concern:*

Be it known that I, THOMAS R. BROWN, a citizen of the United States, residing at Sparkill, in the county of Rockland and State of New York, have invented new and useful Improvements in Car and Electric Couplings, of which the following is a specification.

This invention relates to electric train line couplings for electrically connecting the train line circuits between cars or other vehicles of a train.

My invention relates more particularly to electric train line couplings of the type having a plurality of fixed contacts connected to train line circuits, a movable contact carrier having corresponding contacts, and means for projecting the contact carrier to electrically connect the fixed contacts of counterpart couplings.

One object of my invention is to provide manually operated means for controlling an electric train line coupling of the above type.

Another object of my invention is to provide means for locking the contact carrier in its projected position.

Other objects and advantages will appear in the following more detailed description of the invention.

In the accompanying drawings; Figure 1 is a diagrammatic section of a pair of car couplers locked together and a pair of electric train line couplings in electrical connection, certain portions being broken away, and showing my invention embodied therein; Fig. 2 a plan view of an electric train line coupling with the top cover plate removed; Fig. 3 a sectional view thereof on the line D—D of Fig. 2; Fig. 4 a sectional view on the line A—A of Fig. 2; Fig. 5 a sectional view on the line B—B of Fig. 2; Fig. 6 a sectional view on the line E—E of Fig. 2; Fig. 7 a part sectional view on the line C—C of Fig. 6; Fig. 8 a detail sectional view of the lever mechanism for actuating the contact carrier; Fig. 9 a detail vertical sectional view of one of the shutters; Fig. 10 a plan view of one of the shutters, partly broken away; Fig. 11 a side elevation of a car coupler with an electric train line coupling attached thereto; and Fig. 12 a detail sectional view showing the trigger or carrier locking mechanism.

As shown in the drawings, the electric train coupling comprises a casing 1 secured to the under side of a car coupler head 44, so that when adjacent car couplers are coupled together, the ends of the counterpart train line coupling heads meet.

Within the casing near the meeting end are mounted a plurality of fixed contact fingers 3 arranged horizontally, either in one row, or, as shown in the drawing, in two opposite rows and each adapted to be connected to a wire of a train line circuit.

A longitudinally movable slide or contact carrier 4 is mounted within the casing and is provided with electrically connected contact bars 5 and 6 adapted when the carrier 4 is projected into a counterpart coupling head to electrically connect corresponding fixed contacts 3 and thereby complete the several train line circuits of the train.

For operating the contact carrier 4, a fluid pressure operated piston 7 may be employed, said piston being contained in a cylinder 8 and having pivoted connection with a link 9, the outer end of which is pivoted to a lever 10. One end of the lever is mounted on a fixed pivot pin 11 and the opposite end carries a roller 12 adapted to engage a projecting lug 13 forming part of the slide 4.

In order to position and guide the contact carrier 4 in its longitudinal movement, guide rods 14 are provided, as shown particularly in Figs. 2 and 4, and mounted on each rod are a pair of follower sleeves 15, the outer ends of which form abutments for a coil spring 17 surrounding the rod 14, and the proximate ends of which are flanged.

The contact carrier is provided on opposite sides with a pair of laterally projecting forks 16 adapted to slide on the sleeves 15, and the parts are assembled by drawing the sleeves 15 together against the resistance of the spring 17 and then passing the sleeves at one end through the corresponding forks, the sleeves at the opposite end being then released, so that the spring pressure acts to project the sleeves through the other forks. The forks will then bear against the flanges of the sleeves 15, so that movement of the carrier 4 in either direction will shift one pair of the follower sleeves and thereby compress the springs 17.

Vertical grooves 18 are provided in the end walls of the casing 1 into which the ends of the rods 14 are inserted after assembling the parts of the contact carrier, the rods resting at the bottom of the grooves 18, as shown in Fig. 4, to thereby position the contact carrier in the casing.

In order to lock the contact carrier 4 in its projected position a pivotally mounted trigger 19 may be employed, having a horizontally extending arm, the end of which is adapted to abut against a lug 20 carried at the rear of the carrier 4. The trigger also has a vertically extending arm which is adapted to work in a slot extending through a longitudinally movable rod 21 adapted to be operated by a piston 22 when fluid under pressure is admitted to the chamber 23 at one side of the piston and said piston may also carry a tappet rod 24 which can be pressed manually to operate the piston and thereby the rod 21.

In order to effect the retraction of the contact carrier from its projected position a pipe 25 is connected to chamber 23 and leads to a manually controlled valve device, represented in the drawings as a plug cock 26. One of these controlling valves is preferably provided for each coupling at each end of the car, in position for convenient manipulation by the operator.

The plug cock 26 contains a valve 27 having connected ports 28, 29, and 30 adapted in the normal position of the valve to connect pipe 25 and pipe 31 leading to cylinder 8 with an exhaust port 32. The valve 27 is also provided with a cavity 33 for establishing communication from a fluid pressure supply pipe 34 to pipe 31 in one position and to pipe 25 in another position.

According to my invention, the projected carrier may be retracted on either car by manipulation of either one of the adjacent controlling cocks, and for this purpose, a tappet 35 is provided in a position to be engaged by a corresponding tappet of a counterpart coupling. The tappet 35 has an aperture 36 for establishing communication from a chamber 37 to a corresponding chamber of the counterpart coupling and said chamber communicates through a passage 38 with chamber 23. The tappet 35 is yieldingly pressed outwardly by a spring 39 which also acts on a valve 40 controlling communication from chamber 37 through pipe 41 to cylinder 8. Said valve 40 has a cylindrical guide body fitting within a chamber in the piston 35 and in order to insure free communication from chamber 37 to the aperture 36, said valve is made hollow with a series of ports 42 connecting the interior chamber with the exterior chamber 37.

In operation, the normal position of the parts being as shown in Fig. 6 of the drawings, after the counterpart couplings are brought into engagement, the electric connection of the train line circuits is effected by manipulating either one of the operating handles of the adjacent controlling valves 26, the handle being turned from the normal position, shown in Fig. 1, to the position in which cavity 33 connects pipes 34 and 31. Fluid under pressure is then supplied to the corresponding cylinder 8 and the piston 7 is thereby moved outwardly, as shown at the left side of Fig. 1. The movement of piston 7 shifts the lever 10 so that the roller 12 acts on the lug 13 to project the contact carrier 4 into the counterpart coupling, pushing the adjacent contact carrier out of the way. Electrical connection is then effected between the fixed contacts 3 of the counterpart couplings through the connected pairs of contact bars 5 and 6 on the contact carrier, so that the corresponding train line circuits are thereby closed. During the outward movement of the projected contact carrier, the lug 20 passes over and depresses the end of the trigger 19, but as soon as the trigger clears the lug, the same is returned to its normal position by the action of spring 43, so that the outer end of the trigger then acts as a stop or lock to prevent return movement of the contact carrier. By providing this positive lock, it becomes unnecessary to maintain fluid pressure in the cylinder 8 in order to hold the contact carrier in its projected position, and consequently upon effecting the electric coupling connection between adjacent cars, the controlling valve 27 may be moved back to normal position in which the cylinder 8 is vented to the atmosphere.

When the electric couplings are in engagement, the inward movement of the tappet 35 by contact with the tappet of the counterpart coupling head compresses the spring 39 and the spring pressure thus exerted on the valve 40 is sufficient to hold the same to its seat against the fluid pressure which may be in the cylinder 8 and the pipe 41. It will thus be seen that in coupling up, fluid under pressure does not flow from the coupling of the car on which the controlling valve 26 is manipulated, and consequently, the piston 7 is actuated to project the contact carrier of only one of the counterpart couplings.

Where the electric train line coupling is applied to a car coupling of the type having a lateral and longitudinal movement in the act of coupling, the engaging faces of the adjacent tappets 35 will have a corresponding lateral movement on each other and this tends to maintain the faces clean so as to insure a reasonably tight joint therebetween.

In order to effect the release of the electric coupling, either one of the adjacent cocks 26 is moved to the position in which the cavity 33 connects the pipe 34 with the pipe 25. Fluid under pressure is then supplied to the chamber 23 and thence flows through the passage 38 to chamber 37 and through the ports 42 and the aperture 36 to the registering aperture 36 of the tappet 35 on the counterpart coupling. Fluid consequently flows into chamber 37 of the counterpart coupling and thence through passage 38 to chamber 23 at one side of piston 22. It will thus be seen that both pistons 22 of the connected couplings are acted upon by fluid pressure supplied upon manipulation of one of the controlling cocks 26 and consequently both pistons are shifted outwardly. The traverse of the piston, 22, is very short, being only sufficient to disengage the trip lever, 19 from the lug, 20, and at its outer or rearmost position, it engages a fixed stop or shoulder on the casing. During this movement, the valve, 55, remains seated.

On the coupling which has its contact carrier projected, the trigger 19 will thus be tripped, so that the retraction of the carrier is effected by the action of the springs 17. In this movement, it will be noted that the action is facilitated by the expansive movement of the springs 17 on both the counterpart couplings, since said springs, as hereinbefore stated, are compressed by the movement of the contact carrier in either direction from the normal position and consequently the springs of the projected carrier as well as those of the retracted carrier, when in coupled position, are under compression in a direction to aid in moving both carriers back to normal release position.

Another feature of my invention relates to providing means for effecting the release of the car coupler upon movement of the contact carrier to release position and in order to illustrate this feature of the invention, a pair of connected car and pipe couplers of the tight lock type are shown in Fig. 1 of the drawings, each comprising a main casting 44 having a hook shaped projection 45 provided with a vertical plane surface inclined at an angle to the line of draft and adapted to engage and interlock with a corresponding surface on a projection of a counterpart coupler by a relative lateral movement when the couplers come together in the act of coupling.

Each coupler is provided with a pivoted locking lever 46 adapted to bear against a locking surface 47 on the projection 45 of the counterpart coupler and hold the couplers securely clamped together in the coupled position.

For the purpose of releasing the coupler locks fluid pressure means are provided, such as that set forth in the prior application of James S. Doyle and Frank Hedley, filed March 2 1913, Serial No. 756,469, and comprising a cylinder 48 containing a piston 49 connected by a piston rod 50 with an arm of the locking lever 46. A spring 51 acts on the back of the piston 49 and tends to press the locking lever into engagement with the locking surface 47.

In order to release the coupler lock, fluid under pressure may be admitted to the face of the piston 49 through a passage 52, for actuating the piston to compress the spring 51 and thereby effect the release movement of the coupler locking lever.

According to my present invention, a pipe 53 connects the passage 52 with chamber 54 at the back of piston 22. Normally closing a port through the piston 22 is a valve 55 carried by the rod 21 and on the horizontal lever arm of the trigger 19 is a hump or projection 56. A lug 57 carried by the contact carrier 4 is arranged to engage the projection 56 upon movement of the carrier to normal release position. It will now be evident that when the contact carrier moves to release position, as shown in Fig. 6 of the drawings, the trigger 19 will be depressed by engagement of the lug 57 with the projection 56 and since the fluid under pressure admitted to the face of piston 22 has shifted the same to its rearmost position, the trigger 19 upon being depressed by the lug, 57, will throw the rod 21 outwardly and thereby lift the valve 55 from its seat, so that fluid under pressure can flow from the chamber 23 to the chamber 54 and thence through pipe 53 and passage 52 to the piston 49. As before stated, fluid under pressure is supplied to the chamber 23 of each of the counterpart couplings and consequently each release piston 49 of the counterpart car couplers will be operated by fluid pressure to release the coupler lock, so as to permit the separation of the cars.

When an electric coupling is not connected to a counterpart coupling, the tappet 35 is moved outwardly by the spring 39 and this relieves the valve 40 of spring pressure so that the valve is free to open and vent fluid to the atmosphere in case there should happen to be any leakage of fluid through the valve 26 or otherwise.

In order to prevent entrance of dirt and moisture into the coupling, I preferably employ vertically swinging shutters  an 59 between which the contact carrier 4 reciprocates. Said shutters are supported at their ends by the respective pairs of levers 60 and 61 pivoted to lugs 62 and 63 and on each lever is a projection 64 facing the contact carrier and adapted when the contact carrier is in normal release position to engage within a recess 65. A spring 66 acts on each lever and tends to press the respective shutter against the contact carrier.

When the carrier is in release position, as shown in Fig. 6, each projection 64 rests within its recess 65 and thus permits the shutters to cover the openings above and below the contact carrier. Upon coupling up, one of the carriers is projected forward and the other is retracted and this movement causes each projection 64 to ride out of its recess and thereby operate the levers 60 and 61 to raise the shutters 58 and 59 out of the path of the contact carriers.

Having now described my invention, what I claim as new and desire to secure by Letters Patent, is:—

1. In an electric train line coupling, the combination with a casing containing a plurality of fixed contacts adapted to be connected to train line circuits and a movable contact carrier having corresponding contacts, of hand controlled means for projecting said carrier to electrically connect the fixed contacts of counterpart couplings after engagement of said couplings.

2. In an electric train line coupling, the combination with a casing containing a plurality of fixed contacts adapted to be connected to train line circuits and a longitudinally movable contact slide having corresponding contacts, of fluid pressure operated means for projecting said slide to electrically connect the fixed contacts of counterpart couplings, and a manually operated element for controlling the supply of fluid to said means.

3. In an electric train line coupling, the combination with a casing containing a plurality of fixed contacts adapted to be connected to train line circuits and a longitudinally movable contact slide having corresponding contacts, of means for projecting said slide to electrically connect the fixed contacts of counterpart couplings and a locking device controlled by the movement of the slide for holding the same in its projected position.

4. In an electric train line coupling, the combination with a casing containing a plurality of fixed contacts adapted to be connected to train line circuits and a longitudinally movable contact slide having corresponding contacts, of means for projecting said slide to electrically connect the fixed contacts of counterpart couplings, a locking device for holding the slide in its projected position, and fluid pressure operated means for releasing said locking device.

5. In an electric train line coupling, the combination with a casing containing a plurality of fixed contacts adapted to be connected to train line circuits and a longitudinally movable contact slide having corresponding contacts, of fluid pressure means for projecting said slide to electrically connect the fixed contacts of counterpart couplings, a spring actuated lock for holding said slide in the projected position, a fluid pressure operated means for releasing said lock, and manually operated means for controlling the fluid pressure for projecting the slide and for releasing said lock.

6. In an electric train line coupling, the combination with a casing containing a plurality of fixed contacts adapted to be connected to train line circuits and a movable contact carrier having corresponding contacts, of fluid pressure operated means for projecting said carrier to electrically connect the fixed contacts of counterpart couplings and a lock operating automatically after the outward movement of the contact carrier to hold said carrier in its projected position to thereby permit the release of fluid from said means without retracting the carrier.

7. In an electric train line coupling, the combination with a casing containing a plurality of fixed contacts adapted to be connected to train line circuits and a movable contact carrier having corresponding contacts, of means for projecting said carrier to electrically connect the fixed contacts of counterpart couplings and a spring at each side of the carrier, and arranged to resist the movement thereof in either direction from the intermediate normal position.

8. In an electric train line coupling, the combination with a casing containing a plurality of fixed contacts adapted to be connected to train line circuits and a movable contact carrier having corresponding contacts, of mear for projecting said carrier to electrically connect the fixed contacts of counterpart couplings and a helical spring mounted at each side of said carrier and adapted to be compressed by the movement of the contact carrier in either direction from the normal position.

9. In an electric train line coupling, the combination with a casing containing a plurality of fixed contacts adapted to be connected to train line circuits and a movable contact carrier having corresponding contacts, of means for projecting said carrier to electrically connect the fixed contacts of counterpart couplings, springs at both sides of said carrier, and followers at opposite ends of said springs, and each adapted to be operated by the movement of the carrier in either direction for compressing the springs.

10. In an electric train line coupling, the combination with a casing containing a plurality of fixed contacts adapted to be connected to train line circuits and a movable slide having corresponding contacts, of a fluid operated piston for projecting said slide to electrically connect the fixed contacts of counterpart couplings, a spring for opposing the projection of the slide, and a lock operating automatically after the outward movement of said slide to hold the same in its projected position against the resistance of the spring.

11. In an electric train line coupling, the combination with a casing containing a plurality of fixed contacts adapted to be connected to train line circuits and a movable slide having corresponding contacts, of a fluid operated piston for projecting said slide to electrically connect the fixed contacts of counterpart couplings, a spring for opposing the projection of the slide, a trigger for locking the slide in its projected position, and a fluid operated piston for tripping the trigger to effect the retraction of the slide.

12. In an electric train line coupling, the combination with a casing containing a plurality of fixed contacts adapted to be connected to train line circuits and a movable slide having corresponding contacts, of a fluid operated piston for projecting said slide to electrically connect the fixed contacts of counterpart couplings, a spring for opposing the projection of the slide, a trigger for locking the slide in its projected position, a piston operated by fluid under pressure for tripping the trigger to permit the release of the slide, and a manually controlled cock for controlling the fluid pressure on said piston.

13. In an electric train line coupling, the combination with a casing containing a plurality of fixed contacts adapted to be connected to train line circuits and a movable carrier having corresponding contacts, of means for projecting the carrier to electrically connect the corresponding fixed contacts of counterpart couplings, a fluid actuated lock for holding the carrier in its projected position, means for automatically establishing communication between locks of counterpart couplings upon meeting of the couplings, and a manually operated valve for controlling the fluid pressure on said lock.

14. In an electric train line coupling, the combination with a casing containing a plurality of fixed contacts adapted to be connected to train line circuits and a movable carrier having corresponding contacts, of means for projecting the carrier to electrically connect the corresponding fixed contacts of counterpart couplings, a lock for holding the carrier in its projected position, a piston operated by fluid pressure for tripping said lock, a passage leading to said piston and adapted to register with a corresponding passage of the counterpart coupling in the act of coupling, and a manually operated valve for controlling the admission of fluid pressure to said piston.

15. In an electric train line coupling, the combination with a casing containing a plurality of fixed contacts adapted to be connected to train line circuits and a movable contact carrier having corresponding contacts, of means for projecting said carrier to electrically connect the fixed contacts of counterpart couplings, a lock for holding said carrier in its projected position, a piston operated by fluid under pressure for releasing said lock, and means adapted to be manually actuated for also releasing said lock.

16. In an electric train line coupling, the combination with a casing containing a plurality of fixed contacts adapted to be connected to train line circuits and a movable contact carrier having corresponding contacts, of a fluid operated piston for projecting said carrier to electrically connect the fixed contacts of counterpart couplings, a valve for controlling a vent port from said piston, and means for automatically closing said valve upon engagement of counterpart couplings.

17. In an electric train line coupling, the combination with a casing containing a plurality of fixed contacts adapted to be connected to train line circuits and a movable contact carrier having corresponding contacts, of a fluid operated piston for projecting said carrier to electrically connect the fixed contacts of counterpart couplings, a valve for controlling a vent port from said piston, and a movable tappet actuated upon the meeting of counterpart couplings for closing said valve.

18. The combination with a car coupler comprising a coupler head, a movable lock, and a fluid pressure actuated device for releasing the lock, of an electric train line coupling having a movable contact carrier adapted to be projected for electrically connecting the train line circuits, a lock for holding said carrier in its projected position, a valve operated by said lock for controlling the fluid pressure on said releasing device, and means carried by said carrier for actuating the lock and said valve upon retraction of the carrier from its projected position.

19. The combination with a car coupler comprising a coupler head, a movable lock, and a fluid pressure actuated device for releasing the lock, of an electric train line coupling having a movable contact carrier adapted to be projected for electrically connecting the train line circuits, a lock for holding said carrier in its projected position, a valve operated by said lock for controlling the fluid pressure on said releasing device, and means carried by said carrier for operating said lock to open said valve upon movement of the carrier from its projected position to the normal release position.

In testimony whereof I have hereunto set my hand.

THOMAS R. BROWN.

Witnesses:
A. M. CLEMENTS,
S. W. KEEFER.